United States Patent [19]

Maier

[11] Patent Number: 5,322,298
[45] Date of Patent: Jun. 21, 1994

[54] SHAFT SEAL
[75] Inventor: Martin D. Maier, Olean, N.Y.
[73] Assignee: Dresser-Rand Company, Olean, N.Y.
[21] Appl. No.: 896,065
[22] Filed: Jun. 9, 1992
[51] Int. Cl.[5] .......................................... F16J 15/447
[52] U.S. Cl. .................................. 277/53; 277/134; 277/174
[58] Field of Search ................ 277/3, 27, 53, 68, 133, 277/134, 173, 174, 215

[56] References Cited
U.S. PATENT DOCUMENTS

| | | | |
|---|---|---|---|
| 1,448,079 | 3/1923 | Moeggerath | 277/134 |
| 3,251,601 | 5/1966 | Harvey | 277/53 |
| 3,558,238 | 1/1971 | Van Herpt | 415/169 |
| 3,575,424 | 4/1971 | Taschenberg | 277/27 |
| 3,640,541 | 2/1972 | Taschenberg | 277/96 |
| 3,744,805 | 7/1973 | Heinrich | 277/96 |
| 3,926,442 | 12/1975 | Muller | 277/3 |
| 3,934,888 | 1/1976 | Lutz | 277/134 |
| 3,938,813 | 2/1976 | Forch | 277/152 |
| 3,963,247 | 6/1976 | Nommensen | 277/134 X |
| 3,973,781 | 8/1976 | Grorich | 277/134 |
| 4,071,254 | 1/1978 | Raimondi et al. | 277/3 |
| 4,076,259 | 2/1978 | Raimondi | 277/3 |
| 4,084,826 | 4/1978 | Vossieck et al. | 277/134 |
| 4,094,519 | 6/1978 | Heyn et al. | 277/134 |
| 4,174,845 | 11/1979 | Hadaway | 277/134 |
| 4,304,409 | 12/1981 | Orlowski | 277/53 |
| 4,305,592 | 12/1981 | Peterson | 277/59 |
| 4,383,691 | 5/1983 | Potter | 277/134 |
| 4,406,463 | 9/1983 | Fabrowsky | 277/173 X |
| 4,420,162 | 12/1983 | Yanai et al. | 277/96.1 |
| 4,423,879 | 1/1984 | Takenaka et al. | 277/96.1 |
| 4,441,722 | 4/1984 | Pichler | 277/134 |
| 4,466,620 | 8/1984 | Orlowski | 277/53 |
| 4,497,496 | 2/1985 | Repella | 277/134 |
| 4,504,069 | 3/1985 | Stenlund | 277/174 |
| 4,546,985 | 10/1985 | Forch | 277/134 |
| 4,705,277 | 11/1987 | Repella | 277/134 |
| 4,733,873 | 3/1988 | Takenaka et al. | 277/96.1 |
| 4,948,152 | 8/1990 | Kilthau et al. | 277/80 |

Primary Examiner—William A. Cuchlinski, Jr.
Assistant Examiner—John L. Beres
Attorney, Agent, or Firm—Richards, Medlock & Andrews

[57] ABSTRACT

A shaft seal element (20) for use around a rotatable shaft (10) has an annular sealing surface (22) facing a radially adjacent surface of the shaft or housing. This sealing surface (22) can comprise two outer annular lands (26, 27) with an inner land (28) therebetween. A relief groove (29, 30) separates the inner land (28) from each outer land (26, 27). A plurality of fluid redirecting grooves (40) are obliquely formed across the inner land (28). A protruding ridge (44) is formed at the trailing edge (40b) of each redirecting groove (40). The ridges (44) and redirecting grooves (40) inhibit fluid migration across the sealing surface (22) and divert a portion of the fluid towards the high pressure end of the seal element.

24 Claims, 3 Drawing Sheets

/ 1

SHAFT SEAL

TECHNICAL FIELD OF THE INVENTION

The present invention relates to a shaft seal. In particular, it relates to an obliquely grooved fluid film shaft seal.

BACKGROUND OF THE INVENTION

Seals are used to prevent or minimize leakage of a fluid through mechanical clearances in either the static or dynamic state. In dynamic conditions, a shaft seal is typically placed between a stationary housing and a rotating shaft. Typically, the rotating shaft penetrates a barrier or ring seal. When used in a compressor, a ring seal typically separates a high pressure chamber and a low pressure chamber. Fluid pressure will attempt to escape through any clearance between the shaft and ring seal. However, a clearance must exist between the shaft and seal to allow free rotation of the shaft. Accordingly, the seal must minimize the loss of high pressure fluid through the clearance while not interfering with the rotation of the shaft.

One prior art solution has been the use of windback seals for rotatable shafts in which the seal elements incorporate a plurality of helical threads or grooves to provide a pumping action on the fluid passing through the seal so that a portion of the fluid can be redirected towards the high pressure side of the seal element. The helical grooves can be in the inner cylindrical surface of a stationary seal element or in the external surface of the shaft or a sleeve shrunk onto the shaft. The grooved surface can be opposed by a plain surface or by another grooved surface. These windback seals have been used to prevent migration of sour oil into the machine when fitted at an inner labyrinth, and to prevent cross migration of lubricant oil to seal oil or seal oil to lubricant oil when fitted in a chevron arrangement at a separation labyrinth location. However, in some windback seals the thread grooves extend the length of the seal element, making it more difficult to maintain an adequate seal under static conditions, i.e. when the shaft is not rotating. The use of fine or very shallow depth grooves in a windback seal element has been proposed and would generally provide a better static seal than the deeper grooved windback seal elements, but such shallow grooves are generally more sensitive to mechanical damage resulting from occasional contact between the sealing surface and the radially adjacent surface than the windback seal elements with deeper grooves.

Thus, a need exists for a shaft seal that not only entrains a fluid across the seal as a fluid film, but redirects at least a portion of the fluid back toward the high pressure side of the seal element during the rotation of the shaft, while providing a reasonable degree of sealing under static conditions.

SUMMARY OF THE INVENTION

The present invention relates to a shaft seal element which is applicable to fluid film seals that seal against differential pressure across a rotating shaft. The shaft seal element can be a cylindrical body with a bore therethrough, with the rotatable shaft passing through the bore. The shaft seal element can be pressed longitudinally against the housing by the differential pressure. Any fluid migrating through the seal must pass through the annular clearance between the sealing surface of the shaft seal element and the opposing surface which is radially adjacent to the sealing surface.

The sealing surface can be divided into several annular zones or lands which are spaced along the longitudinal axis of the rotatable shaft. A first outer annular land can be provided at the high pressure end of the seal element, while a second outer annular land can be provided at the low pressure end of the seal element. An inner annular land, located between the two outer lands, has a plurality of obliquely oriented flow diversion grooves positioned therein at axially spaced apart locations. A protruding ridge is positioned at the trailing edge of each flow diverting groove to act as a pressure dam. The flow diverting grooves and associated pressure dam ridges alter the flow path of fluid traversing the seal. A component of the circumferential fluid flow in the annular seal space caused by shaft rotation is redirected by the flow diverting grooves and associated pressure dam ridges toward the high pressure end of the seal element, thereby reducing the loss of fluid through the seal during rotation of the shaft. The hydrodynamic action due to the circumferential flow is disrupted, and this disruption reduces the occurrence of oil whip. The radial clearance at the outer lands is less than the radial clearance at the pressure dam ridges as well as at all other portions of the inner land. Thus, the net result is that the leakage rate of fluid through the seal is substantially reduced, both during rotation of the shaft and during static conditions, and the grooves in the inner land are protected against mechanical damage.

BRIEF DESCRIPTION OF THE DRAWINGS

For a more complete understanding of the present invention, and for further details and advantages thereof, reference is now made to the following detailed description taken in conjunction with the accompanying drawings, in which.

DETAILED DESCRIPTION

The present invention is a fluid film seal that overcomes many of the disadvantages found in the prior art. The fluid film seal is an annular seal element which is suitable for positioning between a housing and a rotatable shaft, to provide a seal between a high pressure area and a low pressure area which are traversed by the rotatable shaft. In some installations, the annular seal element can be secured to the housing so that it is stationary, with the inner circumferential surface of the annular seal element constituting the sealing surface which cooperates with a radially adjacent portion of the external surface of the rotatable shaft. In other installations, the annular seal element can be secured to the shaft so that it rotates with the shaft, with the outer circumferential surface of the annular seal element providing the sealing surface which cooperates with a radially adjacent portion of the internal surface of the housing. In each type of installation, the rotation of the shaft results in relative rotational movement between the sealing surface and the radially adjacent surface. While a preferred embodiment of the invention will be described in terms of a stationary seal element surrounding a rotating shaft, the invention is applicable to either configuration.

Figure 1:
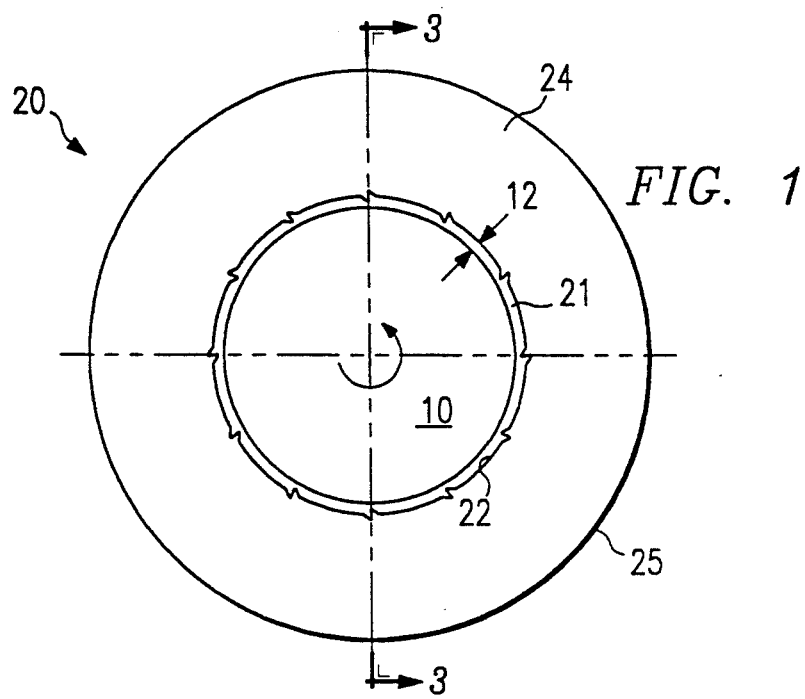
FIG. 1 is an end view of a seal element, in accordance with the present invention, surrounding a rotatable shaft.
Figure 2:
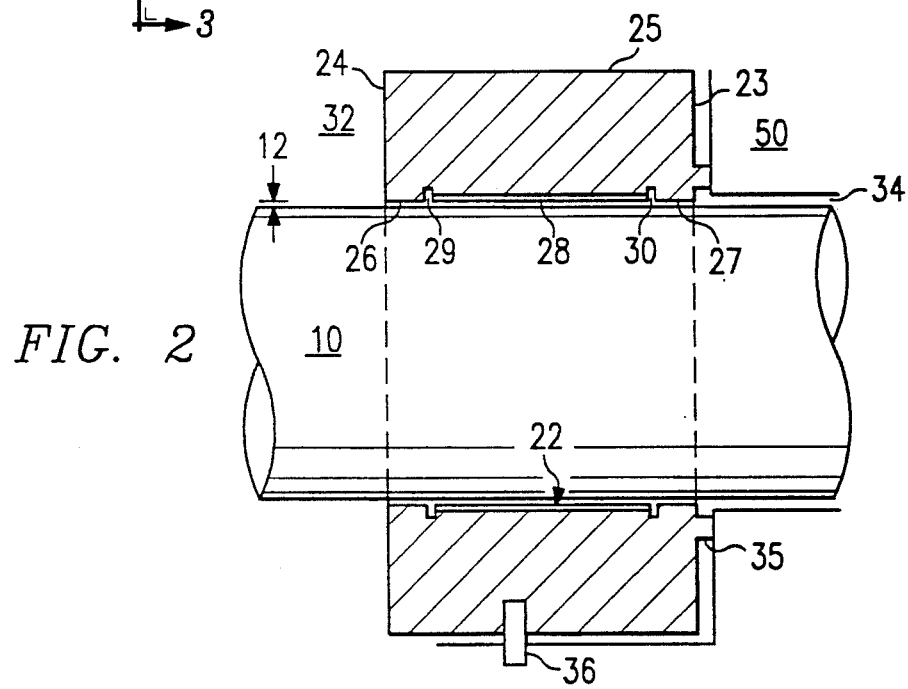
FIG. 2 is a longitudinal view, partly in cross section, of the shaft and seal element of FIG. 1.

Referring to FIGS. 1 and 2, a shaft seal element embodying the present invention is illustrated as an annular seal element 20 having a bore concentrically located therein to provide a generally cylindrical inner surface 22, a first longitudinal end face 23, a second longitudinal end face 24, and an at least generally cylindrical outer surface 25. The seal element 20 is illustrated as being stationarily positioned in a housing 50, at a location between a high pressure area 32 and a low pressure area 34, to surround a rotatable shaft 10 with the generally cylindrical inner surface 22 being the sealing surface of the seal element 20. An anti-rotation pin 36, extending at least generally radially inwardly from an opening in housing 50 into an opening in seal element 20, can be provided to prevent the rotation of seal element 20 with respect to housing 50. The sealing surface 22 is located radially adjacent to a portion of the exterior surface of the shaft 10. The term "radial", as used in this description, relates to a line which extends radially from the longitudinal axis of the rotatable shaft 10. The longitudinal axis of shaft 10 is also the longitudinal axis of the bore of annular seal element 20.

An axially extending annular rim 35 can be provided on the longitudinal end face 23 such that the differential pressure across the seal element 20 longitudinally forces the rim 35 into sealing contact with the longitudinally adjacent portion of housing 50. However, at least a minimum clearance 12 must exist between shaft 10 and sealing surface 22 in order to allow the free rotation of the shaft 10. This necessary clearance results in an annular space 21 formed by the sealing surface 22 and the radially adjacent portion of the external surface of the shaft 10, such that a first longitudinal end of the annular space 21 is exposed to high pressure area 32 while the second longitudinal end of the annular space 21 is exposed to low pressure area 34. Thus, a small amount of the high pressure fluid will traverse the annular space 21 from the high pressure area 32 to the low pressure area 34. This traversing fluid is in the form of a fluid film which encounters sealing surface 22.

Sealing surface 22 is comprised of at least three annular sections 26, 27, and 28, spaced apart along the longitudinal axis of the bore of the seal element 20. The first section 26 is an outer annular land located at the high pressure end of the sealing surface 22, while the third section 27 is a similar outer annular land located at the low pressure end of the sealing surface 22. The second section 28 is an inner annular land located axially between the two outer lands 26, 27. Each of the annular lands 26, 27, and 28 extends the full circumference of the sealing surface 22 as viewed in respective planes perpendicular to the longitudinal axis of the bore of the seal element 20.

Figure 3:
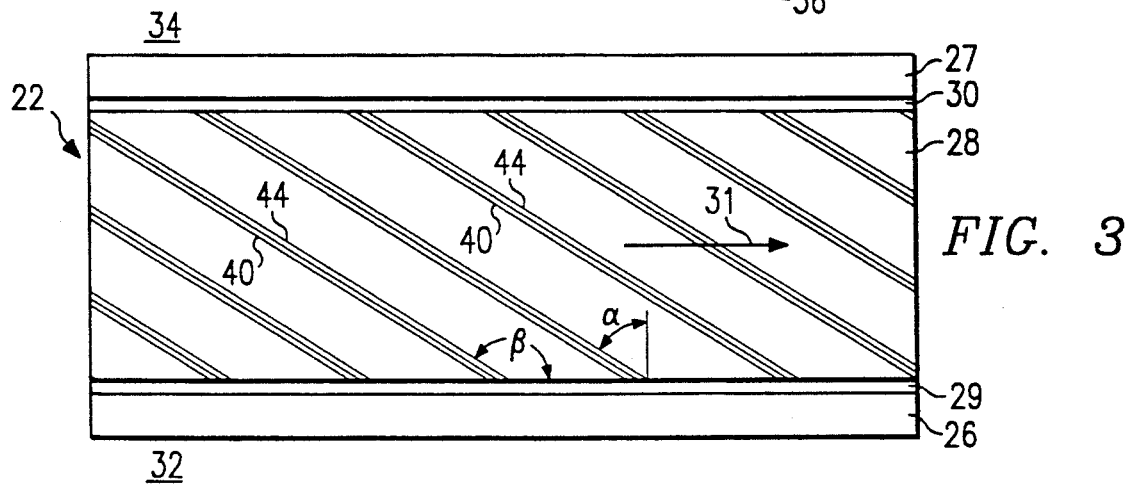
FIG. 3 is a flattened view of the sealing surface of the seal element of FIG. 1.

FIG. 3 provides a flattened view of the generally cylindrical sealing surface 22, with the two outer annular lands 26 and 27 being spaced apart from each other along the axial length of the shaft 10, and the desired direction of rotation of the shaft 10 being indicated by the arrow 31. An annular relief groove 29 can be located between and joining outer land 26 and inner land 28. Similarly, an annular relief groove 30 can be located between and joining outer land 27 and inner land 28. Each of the annular relief grooves 29, 30 can be formed in a respective plane which is perpendicular to the longitudinal axis of shaft 10. Thus the annular relief grooves 29, 30 can be annular cuts in sealing surface 22 which extend at least generally radially outwardly from the cylindrical surface portions of inner land 28 with respect to the longitudinal axis of shaft 10, when the seal element 20 is secured to the housing 50.

A plurality of flow diversion or redirecting grooves 40 are formed obliquely across the inner land 28, with each redirecting groove 40 preferably extending from the first annular relief groove 29 to the second annular relief groove 30. The relief grooves 29, 30 provide a drainage path for fluid entrained in redirecting grooves 40, and also facilitate the formation of the redirecting grooves 40. Typically, the redirecting grooves 40 are parallel to each other and are spaced apart equally about the circumference of inner land 28. Redirecting grooves 40 are inclined at an acute angle $\alpha$ with respect to a line extending parallel to the longitudinal axis of shaft 10 when measured from the intersection of a redirecting groove 40 with the high pressure end of inner land 28. The angle of inclination of redirecting grooves 40 can also be defined as an obtuse angle $\beta$ relative to the direction of rotation, when measured at the high pressure end of inner land 28. Thus, obtuse inclination angle $\beta$ equals ($\alpha + 90°$). The depth and angle of inclination redirecting grooves 40 with respect to the direction of rotation are factors in the effectiveness of redirecting grooves 40 in deterring fluid loss across the seal element 20. While redirecting grooves 40 can be utilized with any suitable groove depth, a presently preferred range for the depth of the redirecting grooves 40 is about 0.003 inch to about 0.020 inch.

Figure 4:
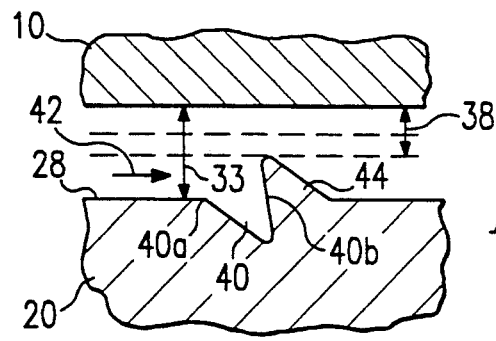
FIG. 4 is a detail view of a redirecting groove and associated pressure dam ridge of the seal element of FIG. 1.

FIG. 4 provides a detailed sectional view of the shaft 10 and the annular seal element 20 in the area of a representative one of the redirecting grooves 40. Circumferential fluid flow occurs in the direction shown by the arrow 42. The redirecting grooves 40 are formed in inner land 28 as cuts which extend at least generally radially outwardly from the cylindrical surface of inner land 28 with respect to the longitudinal axis of shaft 10, when the seal element 20 is secured to the housing 50. While any suitable technique can be employed for the formation of the redirecting grooves 40, it is presently preferred that they be cold-formed by pressing a cold-forming wheel, inclined at an angle to a radial line from the longitudinal axis of the seal element, against the cylindrical surface of inner land 28, and rolling the cold-forming wheel along the desired path of the redirecting groove. The generation of high pressure at the point of contact of the cold-forming roller with the cylindrical surface of land 28 causes the material of the seal element 20 to cold flow into an immediately adjacent region, forming a ridge 44 associated with the respective thus formed redirecting groove 40. The angle of inclination of the cold-forming wheel is chosen so that the associated ridge 44 is formed along the trailing edge of the respective redirecting groove 40. The term "trailing" indicates that a ridge 44 follows the associated redirecting groove 40 when viewed along the line of the circumferential flow of the fluid in the annular seal space 21 when the shaft 10 is rotating in the design direction. Each ridge 44 is preferably coextensive in length with the associated redirecting groove 40 and extends radially inwardly, with respect to the longitudinal axis of shaft 10, when the seal element 20 is secured to the housing 50. As illustrated in FIG. 4, the redirecting groove 40 and the associated pressure dam ridge 44 preferably have an at least generally S-shaped cross section in a plane perpendicular to the longitudinal axis of the seal element 20, i.e. the trailing edge of each groove 40 merges directly and smoothly into the leading edge of the associated ridge 44. The inner land 28, apart from the redirecting grooves 40 and pressure dam ridges 44, is preferably a completely cylindrical surface. As shown in FIG. 3, each redirecting groove 40 is preferably spaced a substantial distance from the ridge 44 of the next adjacent redirecting groove 40.

The circumferential fluid flow encounters the leading edge 40a of a redirecting groove 40 after flowing over a cylindrical area of inner land 28. A portion of the fluid flow is entrapped within the redirecting groove 40 while another portion of the fluid is blocked and redirected by the protruding ridge 44 located at the trailing edge 40b of the redirecting groove 40. The protruding ridge 44 redirects a portion of the fluid flow in a direction normal to the sealing surface 22 thus creating a fluid pressure dam. This fluid pressure dam is an area of increased pressure above each ridge 44 which inhibits fluid flow across the ridge 44. The angle of inclination of redirecting grooves 40 and ridges 44 with respect to the direction of rotation results in a portion of the fluid flow being redirected toward the high pressure end of the seal element 20.

The clearance between the sealing surface 22 and the shaft 10 is not constant across either the circumference or the axial length of the sealing surface 22 of seal element 20. The clearance 12 represents the radial distance between the innermost cylindrical surface of outer lands 26, 27 and the radially adjacent portion of the exterior cylindrical surface of shaft 10. The radial length of clearance 12 depends upon the diameter of shaft 10 and the differential pressure across seal element 20 but is typically between about 0.004 and about 0.008 inch for a shaft diameter in the range of 2 to 4 inches. The clearance 33 is the radial distance between the strictly cylindrical portions of inner land 28 and the radially adjacent portion of the exterior surface of shaft 10. The clearance 38 is the radial distance between the crown of a ridge 44 and the radially adjacent portion of the exterior surface of shaft 10. The radial clearance 12 is slightly less than the clearance 38, so that the outer lands 26, 27 protect the ridges 44 from vibrational contact with shaft 10. In turn, clearance 38 is less than clearance 33, so that a flow path of adequate cross section is provided for the fluid film in the regions of the inner annular land 28 between the ridges 44. The radial distance between the radially adjacent portion of the surface of shaft 10 and the bottom of the annular relief grooves 29, 20 will generally be greater than the radial distance between the radially adjacent portion of the surface of shaft 10 and the bottom of each of the flow diversion grooves 40.

Figure 5:
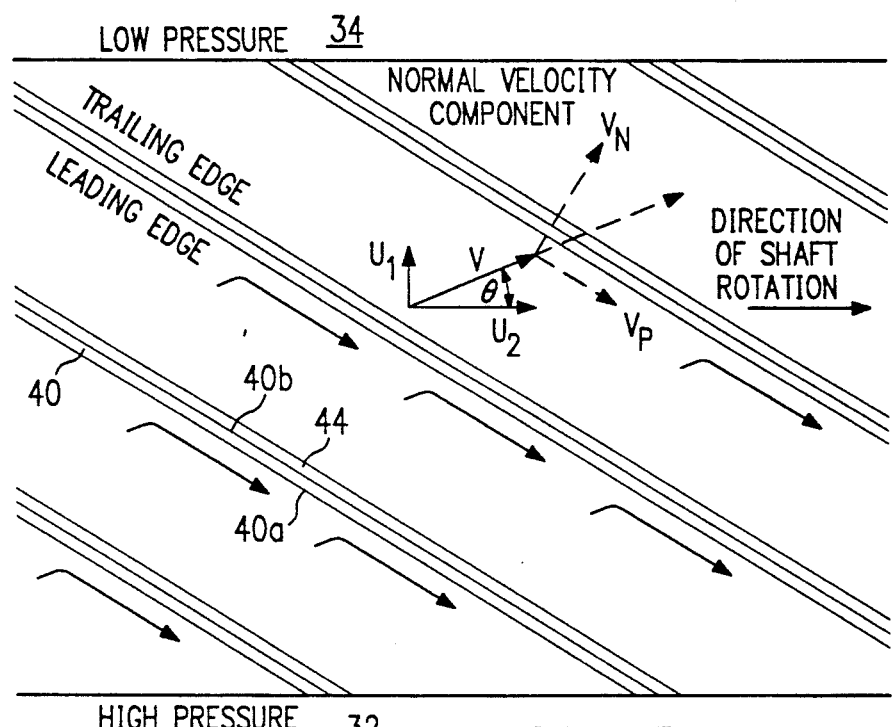
FIG. 5 illustrates the axial and circumferential velocity components of the flow of the lubricating fluid between the shaft and the seal element.
Figure 5A:
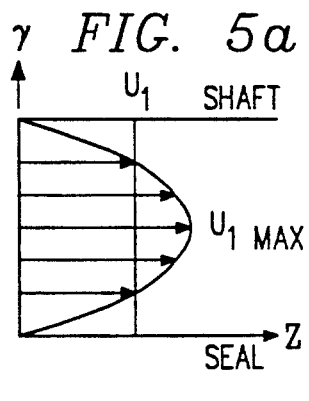
FIG. 5a illustrates an axial flow velocity diagram.
Figure 5B:
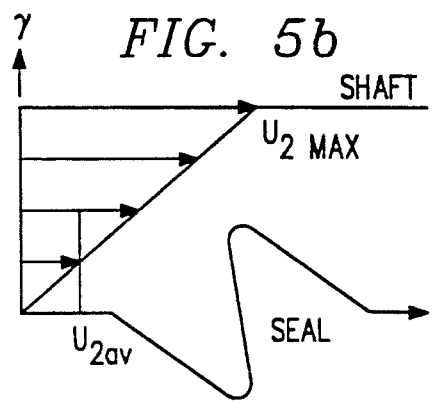
FIG. 5b illustrates a circumferential flow velocity diagram.

FIGS. 5, 5a, and 5b illustrate the flow vectors of the fluid film across the face of inner annular land 28. The fluid film has a circumferential velocity vector $U_2$ in the direction of shaft rotation, as well as an axial velocity vector $U_1$. These two velocity vectors combine to form the actual velocity vector V, which is inclined to the direction of rotation by the angle $\theta$. The fluid will naturally follow the direction of velocity vector V as it traverses the strictly cylindrical portions of inner annular land 28. When the fluid encounters a redirecting groove 40, a portion of the fluid flow is obstructed by the protruding ridge 44. The component of the impinging fluid that is parallel to the redirecting groove 40 due to ridge 44 has a velocity $V_P$ and the component of the impinging flow that is normal to the redirecting groove has a velocity $V_N$. Thus, a portion of the fluid flow will be redirected and constrained to flow along the redirecting groove 40 towards the high pressure end (towards groove 29) when the fluid encounters a protruding ridge 44. The parallel flow component $V_P$ is related to the flow of the fluid in the direction of the redirecting groove 40. The energy associated with the normal velocity component $V_N$ is related and proportional to the pressure build-up that will take place from viscous and inertia effects as the fluid undergoes sudden deceleration. Hence, the protruding ridges 44 act as pressure dams. This build-up in pressure along the length of the redirecting grooves 40 impedes the fluid as it would attempt to flow past these redirecting grooves 40 and ridges 44 in the direction of rotation. The flow of the fluid in the direction of the redirecting grooves 40 also impedes the flow of the fluid in the direction of rotation. The inclination angle "$\beta$" of the redirecting grooves should be chosen in such a way as to produce a $V_P$ velocity component that is oriented away from the low pressure side 34 of the seal element 20 and toward the high pressure side 32. The net result is that a portion of the flow of the fluid is altered from the path of vector V (toward the low pressure end 34) to the path of vector $V_P$ (toward the high pressure end 32).

The seal element 20 is typically made of carbon steel while the sealing surface 22 is typically coated with a babbitt metal. The oblique redirecting grooves 40 and ridges 44 are illustrated as being located on the seal ring 20 (stationary component). However, the redirecting grooves 40 and ridges 44 can be formed in the exterior surface of the shaft 10 or the exterior surface of a shaft sleeve (rotating component). When the seal element 20 is secured to the shaft 10 instead of the housing 50, the "radially inwardly" and "radially outwardly" directions of extension of the annular relief grooves 29, 30, the redirecting grooves 40, and the ridges 44 from the sealing surface 22 with respect to the longitudinal axis of the shaft 10 are reversed from those found in a seal element secured to the housing 50. Similarly, when the seal element 20 is secured to the shaft 10, the radial clearances are determined between the sealing surface 22 and the radially adjacent surface of the housing 50, rather than between sealing surface 22 and the radially adjacent surface of the shaft 10. Also, when the seal element 20 is secured to the housing 50, the "radially adjacent surface of the shaft" may be the radially adjacent surface of a rotating element, e.g. a balance piston, mounted on the shaft rather than the shaft per se. The oblique combinations of a redirecting groove and a ridge are preferably equally spaced about the circumference of the shaft, but can be positioned at differing intervals.

FIG. 5b indicates that the average centrifugal flow velocity component $U_{2av}$ is approximately 25% of the peripheral shaft velocity $U_{2max}$ for a ridge height equal to half the radial clearance 33. If the redirecting grooves 40 and ridges 44 were to be placed on the exterior cylindrical surface of a rotating seal element 20 instead of the inner cylindrical surface of a stationary seal element 20, the velocity diagram would be altered, with the average circumferential velocity $U_2$ being approximately 75% of $U_{2max}$. A higher $U_{2av}$ component may be advantageous in some instances. However, the groove inclination angle $\beta$ will generally need to be greater if the redirecting grooves 40 and ridges 44 are placed on the external surface of a rotating element.

Figure 6:
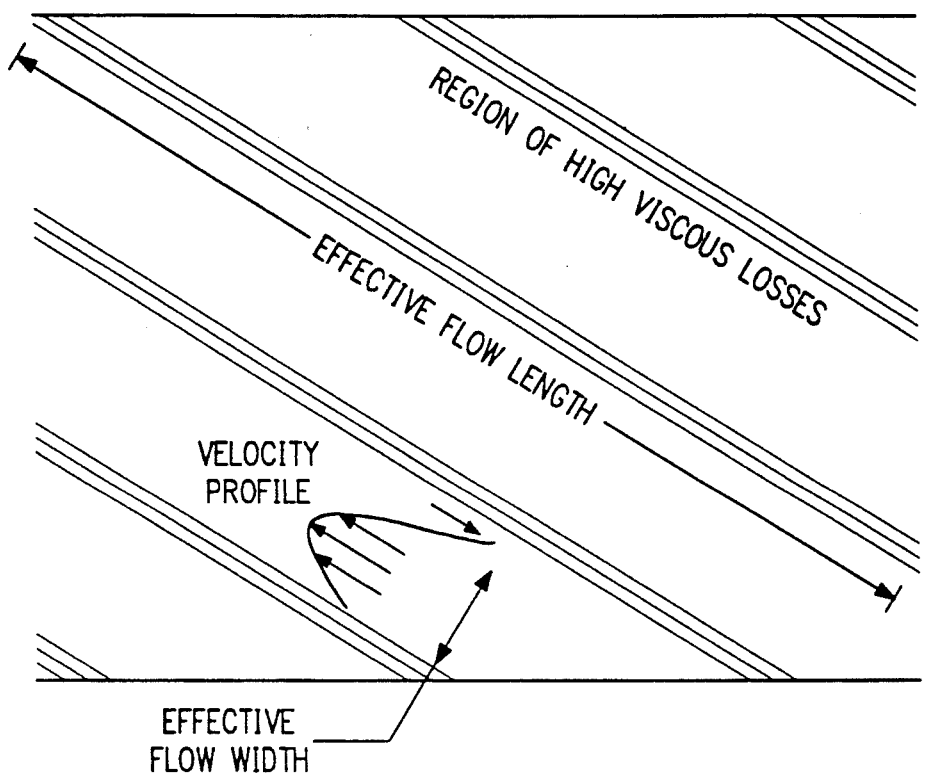
FIG. 6 illustrates the flow velocity vectors with the primary flow being parallel to the redirecting grooves.

FIG. 6 is a schematic which shows a simplified velocity profile of the fluid as it seeks the path of least resistance. The fluid will tend to follow a path which is parallel to the redirecting groove. The effective flow path is therefore lengthened, resulting in a lower leakage rate. Also, high viscous losses will occur in the region near the leading edges of the redirecting grooves where a reversal in flow direction takes place. This too will reduce the leakage rate. An added benefit occurs when the circumferential flow is broken up, thereby preventing hydrodynamic action from occurring which can lead to oil whip and rotor instability.

Figure 7:
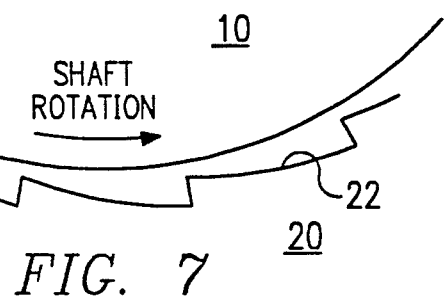
FIG. 7 illustrates an alternative redirecting groove profile.

FIG. 7 shows an alternate redirecting groove and ridge profile which can be used. While the redirecting grooves shown in FIGS. 1, 2 and 3 are linear in nature, the redirecting grooves could be provided in some other suitable shape or contour if it should prove to be advantageous.

Although preferred embodiments of the invention have been described in the foregoing detailed description and illustrated in the accompanying drawings, it will be understood that the invention is not limited to the embodiments disclosed, but is capable of numerous rearrangements, modifications and substitutions of parts and elements without departing from the spirit of the invention. Accordingly, the present invention is intended to encompass such rearrangements, modifications, and substitutions of parts and elements as fall within the spirit and scope of the invention.

I claim:

1. An annular seal element suitable for positioning between a housing and a rotatable shaft to provide a seal between a high pressure area and a low pressure area, said annular seal element comprising a seal body with a bore therethrough such that said seal body has a first longitudinal end surface, a second longitudinal end surface, an inner generally cylindrical surface, and an outer generally cylindrical surface, one of said inner generally cylindrical surface and said outer generally cylindrical surface constituting a sealing surface which faces a radially adjacent surface such that rotational movement can be achieved by one of said sealing surface and said radially adjacent surface relative to the other of said sealing surface and said radially adjacent surface, said seal body being adapted to surround the rotatable shaft with the rotatable shaft extending through said bore such that a first longitudinal end of the annular space formed by said sealing surface and said radially adjacent surface is exposed to said high pressure area and a second longitudinal end of said annular space is exposed to said low pressure area such that the difference in pressure between said high pressure area and said low pressure area tends to cause a fluid film to flow from said first longitudinal end of said annular space towards said second longitudinal end of said annular space, said sealing surface having first, second and third annular lands spaced apart along the longitudinal axis of said seal body, said second annular land being positioned between said first and third annular lands, said second annular land having a first end and a second end, said second annular land having a plurality of flow diversion grooves extending across said second annular land from adjacent said first end of said second annular land to adjacent said second end of said second annular land, each such flow diversion groove having a leading edge and a trailing edge, each such flow diversion groove being inclined at an obtuse angle to the direction of rotation of the shaft, and a plurality of ridges, each of said ridges being positioned in said second annular land adjacent to the trailing edge of a respective one of said flow diversion grooves, wherein the radial clearance between said radially adjacent surface and each of said first and third annular lands is less than the radial clearance between said radially adjacent surface and each of said ridges, whereby said first and second annular lands protect said ridges against contact with said radially adjacent surface, and whereby a component of fluid flow through said annular space from said high pressure area toward said low pressure area is redirected towards said high pressure area.

2. An annular seal element in accordance with claim 1 wherein said sealing surface further comprises a first annular relief groove positioned between said first annular land and said second annular land, and a second annular relief groove positioned between said third annular land and said second annular land.

3. An annular seal element in accordance with claim 2 wherein each of said ridges is at least substantially coextensive in length with and parallel to the associated flow diversion groove.

4. An annular seal element in accordance with claim 3 wherein said first annular relief groove joins said second annular land and said first annular land, and wherein said second annular relief groove joins said third annular land and said second annular land.

5. An annular seal element in accordance with claim 4 wherein each of flow diversion grooves extends from said first annular relief groove to said second annular relief groove.

6. An annular seal element in accordance with claim 5 wherein each of said ridges is joined directly to the trailing edge of the associated flow diversion groove.

7. An annular seal element in accordance with claim 6 wherein the leading edge of each flow diversion groove is spaced a substantial distance from the ridge associated with the immediately adjacent flow diversion groove.

8. An annular seal element in accordance with claim 7 wherein said flow diversion grooves are parallel to each other and are equally spaced about the circumference of said second annular land.

9. An annular seal element in accordance with claim 8 wherein said sealing surface is the inner generally cylindrical surface of said annular seal element, and wherein said radially adjacent surface is the exterior surface of said rotatable shaft.

10. An annular seal element in accordance with claim 9 wherein the radial height of each ridge is sufficient to redirect the direction of flow of a fluid film encountering the respective ridge into a direction substantially normal to the sealing surface.

11. An annular seal element in accordance with claim 10 wherein each of said flow diversion grooves is dimensioned to entrain a portion of the fluid of a fluid film encountering the respective flow diversion groove and to convey the thus entrained fluid to at least one of said relief grooves.

12. An annular seal element in accordance with claim 11 wherein said second annular land, other than said flow diversion grooves and said plurality of ridges, is a cylindrical surface.

13. An annular seal element in accordance with claim 12 wherein each of said first and third annular lands is a cylindrical surface.

14. An annular seal element in accordance with claim ridge are cold-formed in said second annular land at an acute angle to a radius extending outwardly from the longitudinal axis of said seal body.

15. An annular seal element in accordance with claim 1 wherein each of said ridges is at least substantially coextensive in length with and parallel to the associated flow diversion groove.

16. An annular seal element in accordance with claim 1 wherein each of said ridges is joined to the trailing edge of the associated flow diversion groove.

17. An annular seal element in accordance with claim 1 wherein the leading edge of each flow diversion groove is spaced a substantial distance from the ridge associated with the immediately adjacent flow diversion groove.

18. An annular seal element in accordance with claim 1 wherein said flow diversion grooves are parallel to each other and are equally spaced about the circumference of said second annular land.

19. An annular seal element in accordance with claim 1 wherein said sealing surface is the inner generally cylindrical surface of said annular seal element, and wherein said radially adjacent surface is the exterior surface of said rotatable shaft.

20. An annular seal element in accordance with claim 1 wherein the radial height of each ridge is sufficient to redirect the direction of flow of a fluid film encountering the respective ridge into a direction substantially normal to the sealing surface.

21. An annular seal element in accordance with claim 1 wherein each of said flow diversion grooves is dimensioned to entrain a portion of the fluid of a fluid film encountering the respective flow diversion groove and to convey the thus entrained fluid along the respective flow diversion groove.

22. An annular seal element in accordance with claim 1 wherein said second annular land, other than said flow diversion grooves and said plurality of ridges, is a cylindrical surface.

23. An annular seal element in accordance with claim 1 wherein each of said first and third annular lands is a cylindrical surface.

24. An annular seal element in accordance with claim 1 wherein each flow diversion groove and the associated ridge are cold-formed in said second annular land at an acute angle to a radius extending outwardly from the longitudinal axis of said seal body.

* * * * *

UNITED STATES PATENT AND TRADEMARK OFFICE
CERTIFICATE OF CORRECTION

PATENT NO. : 5,322,298
DATED : June 21, 1994
INVENTOR(S) : Martin D. Maier

It is certified that error appears in the above-indentified patent and that said Letters Patent is hereby corrected as shown below:

Column 9, line 14, after "claim" insert --13 wherein each flow diversion groove and the associated--.

Signed and Sealed this

Sixth Day of September, 1994

Attest:

BRUCE LEHMAN

*Attesting Officer*    *Commissioner of Patents and Trademarks*